US007362885B2

(12) United States Patent
Hammoud

(10) Patent No.: US 7,362,885 B2
(45) Date of Patent: Apr. 22, 2008

(54) OBJECT TRACKING AND EYE STATE IDENTIFICATION METHOD

(75) Inventor: Riad I. Hammoud, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 709 days.

(21) Appl. No.: 10/828,005

(22) Filed: Apr. 20, 2004

(65) Prior Publication Data

US 2005/0232461 A1 Oct. 20, 2005

(51) Int. Cl.
*G06K 9/00* (2006.01)

(52) U.S. Cl. ...................... 382/117; 382/100; 382/203; 382/115; 382/118; 382/181

(58) Field of Classification Search ................ 382/100, 382/103, 104, 107, 117, 154, 181, 203, 205, 382/209, 237, 257, 279, 283, 291
See application file for complete search history.

(56) References Cited

U.S. PATENT DOCUMENTS

RE36,041 E 1/1999 Turk et al. .................. 382/118
5,859,686 A * 1/1999 Aboutalib et al. .......... 351/209
5,859,921 A * 1/1999 Suzuki ........................ 382/118
6,072,893 A * 6/2000 Luo et al. ................... 382/117
6,571,002 B1 * 5/2003 Ogawa ....................... 382/117
6,606,397 B1 * 8/2003 Yamamoto .................. 382/117
6,717,518 B1 * 4/2004 Pirim et al. ................. 340/576
2002/0081032 A1 * 6/2002 Chen et al. ................. 382/199
2003/0228044 A1 * 12/2003 Gopalasamy et al. ....... 382/132

* cited by examiner

*Primary Examiner*—Samir Ahmed
*Assistant Examiner*—Eric Rush
(74) *Attorney, Agent, or Firm*—Jimmy L. Funke

(57) ABSTRACT

An object tracking method tracks a target object between successively generated infrared video images using a grey-scale hat filter to extract the target object from the background. The filtered image is binarized, and candidate binary blobs are extracted. The binary blob that minimizes the Euclidian spatial distance to the previous position of the object and satisfies a specified appearance model is selected, and its center of mass is taken as the current position of the object. Where the object is a person's eye, the eye state and decision confidence are determined by analyzing the shape and appearance of the binary blob along with changes in its size and the previous eye state, and applying corresponding parameters to an eye state decision matrix.

6 Claims, 6 Drawing Sheets

10
12 CCD CAMERA
14 IMAGE PROCESSOR
14a
14b
16 DRIVER MONITOR
18 ALARM

| BSF_SIGN | $ES_{t-1}$ | CSC | ABD | EYE_STATE | |
|---|---|---|---|---|---|
| DIRECTION OF CHANGE | FORMER EYE STATE | BINARY BLOB SHAPE | MODEL BASED DECISION | $ES_t$ | CONF |
| POS ( Small to Large ) | Open | Round | Open | OPEN | 100% |
| | Open | Round | Closed | OPEN | 80% |
| | Open | Non-Round | Open | OPEN | 80% |
| | Open | Non-Round | Closed | CLOSED | 100% |
| | Closed | Round | Open | OPEN | 100% |
| | Closed | Round | Closed | CLOSED | 80% |
| | Closed | Non-Round | Open | OPENED | 60% |
| | Closed | Non-Round | Closed | CLOSED | 100% |

FIG. 5A

| BSF_SIGN | $ES_{t-1}$ | CSC | ABD | EYE_STATE | |
|---|---|---|---|---|---|
| DIRECTION OF CHANGE | FORMER EYE STATE | BINARY BLOB STATE | MODEL BASED DECISION | $ES_t$ | CONF |
| NEG ( Large to Small ) | Open | Round | Open | OPEN | 100% |
| | Open | Round | Closed | OPEN | 80% |
| | Open | Non-Round | Open | CLOSED | 80% |
| | Open | Non-Round | Closed | CLOSED | 100% |
| | Closed | Round | Open | OPEN | 100% |
| | Closed | Round | Closed | CLOSED | 80% |
| | Closed | Non-Round | Open | OPENED | 60% |
| | Closed | Non-Round | Closed | CLOSED | 100% |

FIG. 5B

OBJECT TRACKING AND EYE STATE IDENTIFICATION METHOD

TECHNICAL FIELD

The present invention relates to an object tracking method for tracking the location of an object in successively generated frames of a video image, and where the object is a person's eye, for identifying the eye state as open or closed.

BACKGROUND OF THE INVENTION

Vision systems frequently entail locating and tracking an object such as a person's eye in successively generated frames of video data. In the motor vehicle environment, for example, a CCD camera can be used to generate a video image of the driver's face, and portions of the image corresponding to the driver's eyes can be analyzed to assess driver gaze or drowsiness. See, for example, the U.S. Pat. Nos. 5,795,306; 5,878,156; 5,926,251; 6,097,295; 6,130,617; 6,243,015; 6,304,187; and 6,571,002, incorporated herein by reference. While eye location and tracking algorithms can work reasonably well in a controlled environment, they tend to perform poorly under real world imaging conditions, particularly in systems having only one camera. For example, the ambient illumination can change dramatically, the subject may be wearing eyeglasses or sunglasses, and the subject's head can be rotated in a way that partially or fully obscures the eye.

Tracking eye movement from one video frame to the next is generally achieved using a correlation technique in which the eye template (i.e., a cluster of pixels corresponding to the subject's eye) of the previous frame is compared to different portions of a search window within the current frame. Correlation values are computed for each comparison, and the peak correlation value is used to identify the eye template in the current frame. While this technique is useful, the accuracy of the eye template tends to degenerate over time due to drift and conditions such as out-of-plane rotation of the subject's head, noise and changes in the eye appearance (due to glasses, for example). At some point, the eye template will be sufficiently degenerated that the system must enter a recovery mode in which the entire image is analyzed to re-locate the subject's eye.

SUMMARY OF THE INVENTION

The present invention is directed to an improved object tracking method that tracks a target object between successively generated infrared video images using an optimized grey-scale hat filter to extract the target object from the background. The filtered image is binarized, and candidate binary blobs are extracted. The binary blob that minimizes the Euclidian spatial distance to the previous position of the object and satisfies a specified appearance model is selected, and its center of mass is taken as the current position of the object. Where the object is a person's eye, the eye state is determined by analyzing the shape and appearance of the binary blob along with changes in its size and the previous eye state, and applying corresponding parameters to an eye state decision matrix. The decision matrix also indicates a confidence in the eye state determination.

BRIEF DESCRIPTION OF THE DRAWINGS

The present invention will now be described, by way of example, with reference to the accompanying drawings, in which:—

FIGS. 5A and 5B are charts depicting eye state decision matrices used according to this invention to deduce a subject's eye state.

DESCRIPTION OF THE PREFERRED EMBODIMENT

The object tracking method of the present invention is disclosed in the context of a system that tracks and monitors the eye of a motor vehicle driver, and additionally determines whether the eye is open or closed. However, it will be recognized that the disclosed tracking method is equally applicable to other vision systems that track the location of an object, whether animate or inanimate.

Figure 1:
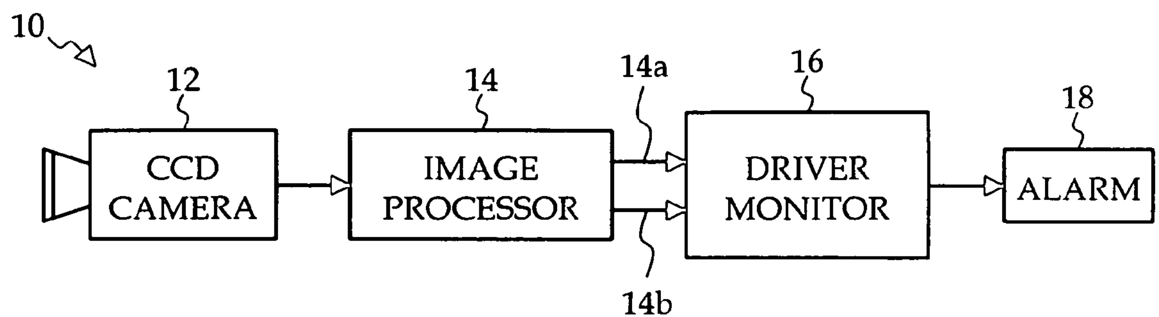
FIG. 1 is a block diagram of a motor vehicle vision system including a video camera and a microprocessor-based image processor for monitoring driver alertness.

Referring to the drawings, and particularly to FIG. 1, the reference numeral 10 generally designates a motor vehicle vision system for monitoring driver alertness. The system 10 includes an infrared CCD camera 12, a microprocessor-based image processor 14, a driver monitor 16, and an alarm 18. The camera 12 is mounted in a convenient location within the vehicle passenger compartment, such as in a center console or instrument panel, and is configured to produce an unobstructed image of the driver's head, taking into account differences in driver height and orientation. The image processor 14 captures a stream of infrared video frames or images ($IMAGE_{t-1}$, $IMAGE_t$, etc.) produced by camera 12, and executes software routines for producing outputs on lines 14*a* and 14*b* pertaining to the eye position and the eye state, respectively. As explained below, the eye position in each video image is defined by a state vector $S_t$, and the eye state is defined by a binary state variable $ES_t$, and a confidence level CONF that the determined eye state is accurate. The driver monitor 16 receives the driver eye information from image processor 14, detects eye movement and/or states characteristic of driver drowsiness and/or distraction, and activates the alarm 18 or other safety alert when it is determined that the driver's lack of alertness or attention may possibly compromise vehicle safety.

Figure 2A:
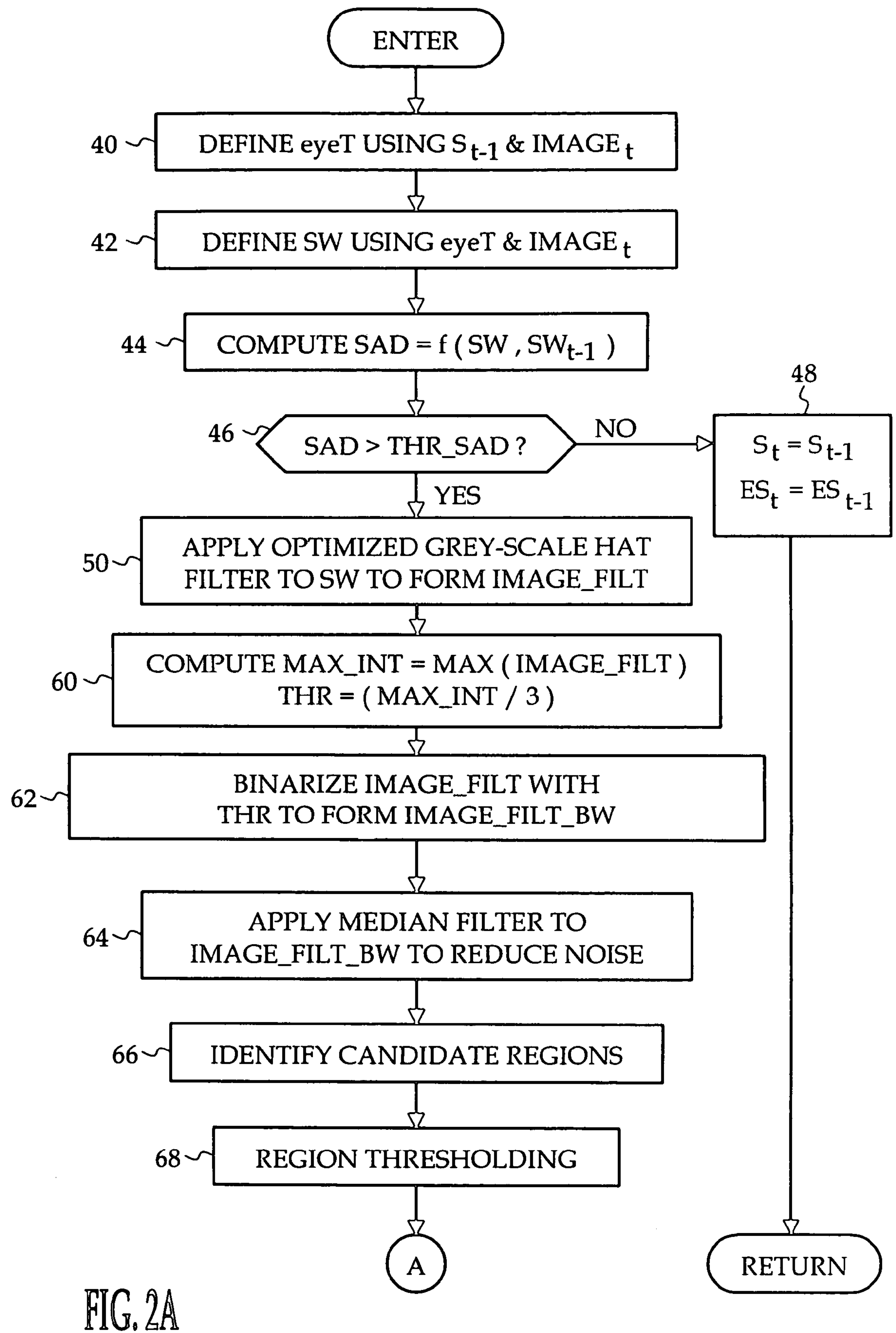
FIGS. 2A, 2B and 2C together depict a flow diagram of a software routine executed by the image processor of FIG. 1 for carrying out the object tracking and eye state identification method of this invention.
Figure 2B:
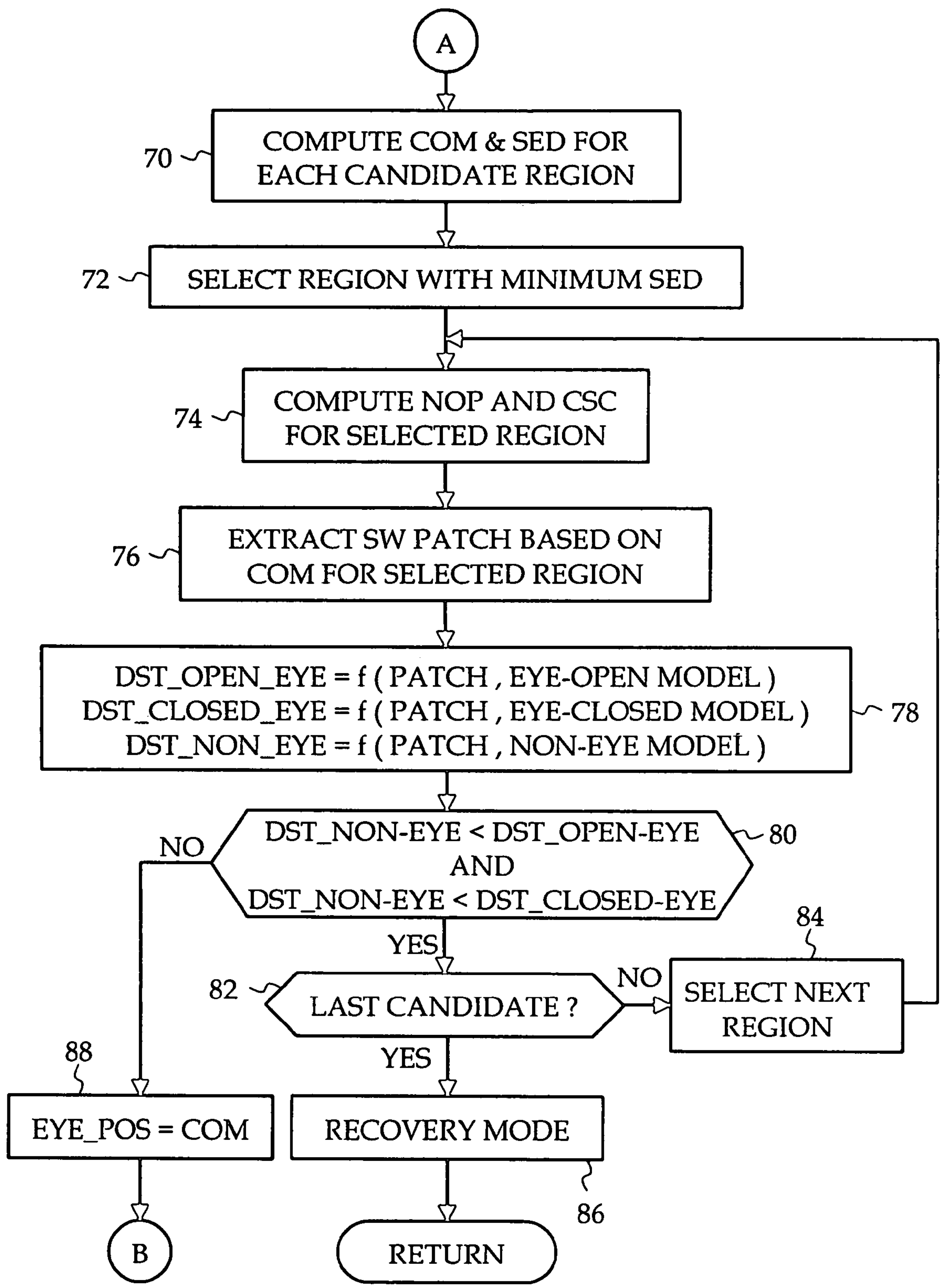
Figure 2C:
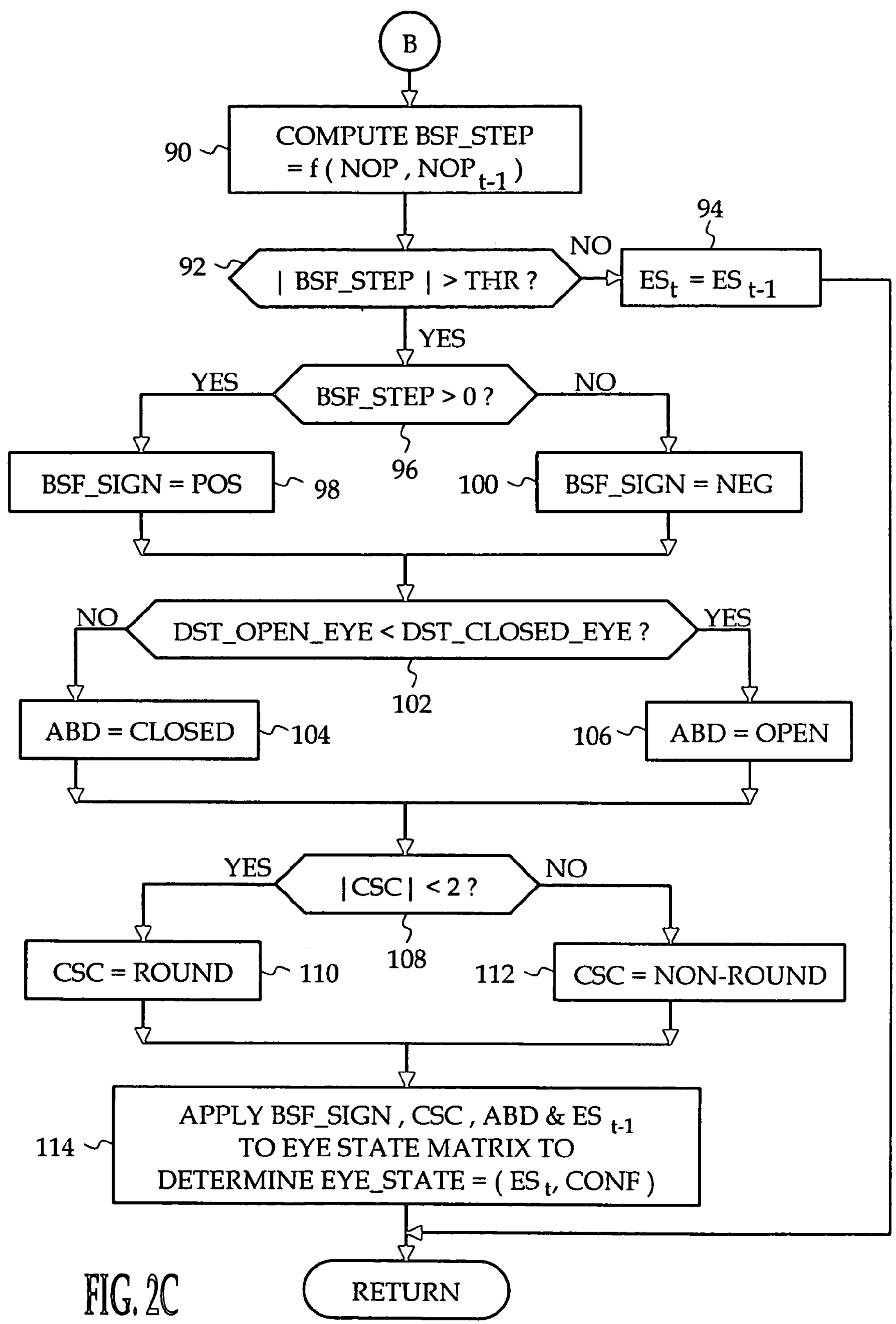

The flow diagram of FIGS. 2A-2C depicts a software routine executed by the image processor 14 according to this invention. Inputs to the routine include the current video image $IMAGE_t$, and a state vector $S_{t-1}$ and search window $SW_{t-1}$ for the previous video image $IMAGE_{t-1}$. The blocks 40 and 42 are first executed to define a portion (referred to herein as a search window SW) of the current image $IMAGE_t$ that should include the driver's eye, even with driver movement between $IMAGE_{t-1}$ and $IMAGE_t$. This is achieved by defining the coordinates of an eye template (eyeT)—that is, a small set of pixels that encompass primarily just the driver's eye—based on the state vector $S_{t-1}$ for $IMAGE_{t-1}$, applying the coordinates of eyeT to $IMAGE_t$, and defining the search window SW as a larger portion of $IMAGE_t$ that includes both eyeT and a set of pixels surrounding eyeT. The block 44 then carries out a sum-of-absolute-differences (SAD) computation on the search window SW for the current image $IMAGE_t$ and the search window $SW_{t-1}$ for the previous image $IMAGE_{t-1}$. The SAD computation is essentially a pixel-by-pixel comparison of SW and $SW_{t-1}$, and provides a fast and reliable measure of the driver movement between the successive images $IMAGE_{t-1}$ and $IMAGE_t$. The block 46 compares the computed SAD value to a predefined threshold THR_SAD. If SAD<=THR_SAD, there is inconsequential driver movement between the images $IMAGE_{t-1}$ and $IMAGE_t$, and the block 48 sets the current state vector $S_t$ and the eye state $ES_t$ equal to the previous values $S_{t-1}$ and $ES_{t-1}$. If SAD>THR_SAD, there is significant driver eye movement between the images $IMAGE_{t-1}$ and $IMAGE_t$, and the remainder of the routine is executed to identify $S_t$ and $ES_t$ for the current image $IMAGE_t$.

Figure 3:
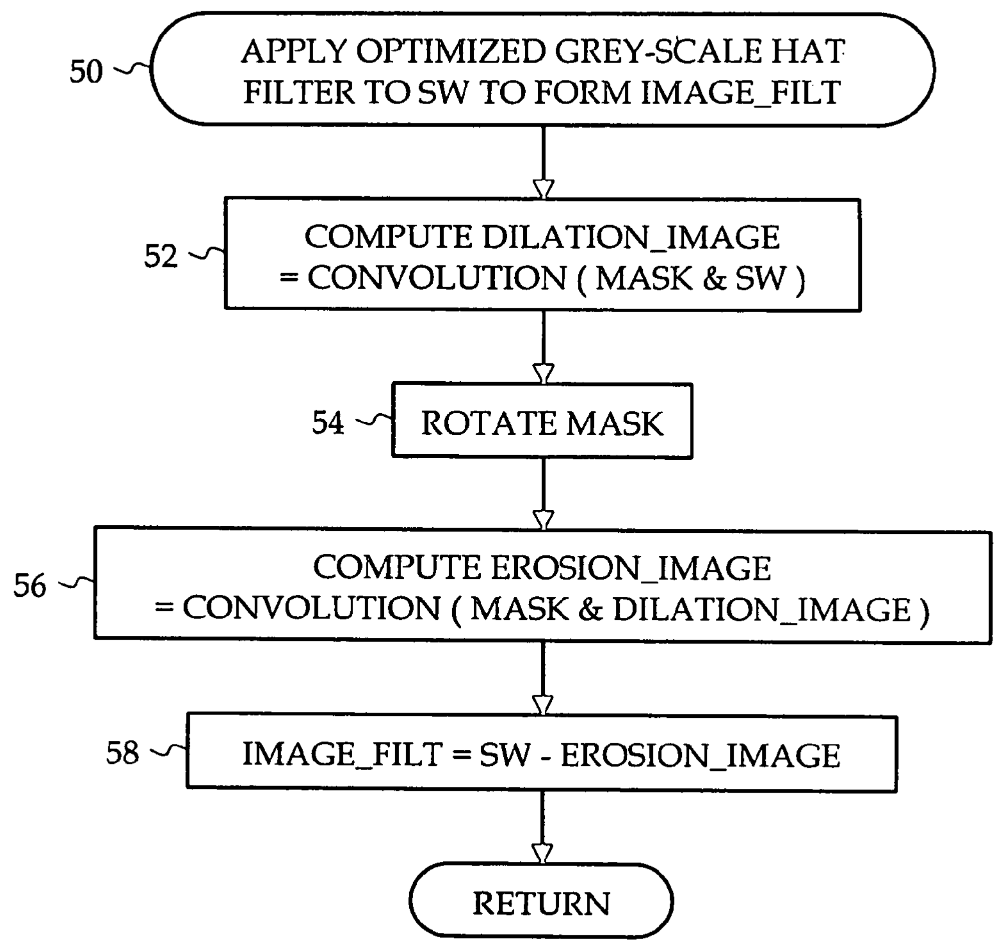
FIG. 3 is a flow diagram detailing a portion of the flow diagram of FIG. 2A pertaining to grey-scale hat filtering.

The first step in identifying the location of the driver's eye in $IMAGE_t$ is to filter the search window SW with an optimized grey-scale bottom hat filter, as indicated at block 50 in FIG. 2, and detailed by the blocks 52-58 of FIG. 3. In general, the grey-scale bottom hat filter enhances the edges of objects within the search window SW, removing small existing holes in it. And according to this invention, the grey-scale hat filter is optimized through the use of a non-flat structuring element or mask that corresponds in shape to the object; in the illustrated embodiment where the object is a driver's eye, the mask is ellipsoid-shaped. Referring to FIG. 3, the grey-scale hat filtering comprises a dilation operation (block 52) followed by an erosion operation (blocks 54 and 56) and a subtraction of the result of the erosion operation from the search window SW (block 58). The dilation and erosion operations are both real-time morphological convolution functions in which the structuring element or mask (which may be a 31-by-31 block of pixels, for example) is scanned over the image being filtered. As indicated at block 52, the result of the dilation operation (DILATION_IMAGE) is obtained by a convolution function in which the structuring element or mask (MASK) is scanned over the search window SW. The blocks 54 and 56 then rotate the MASK by 180 degrees and perform an erosion convolution function in which the rotated MASK is scanned over the DILATION_IMAGE to form the EROSION_IMAGE. And finally, the EROSION_IMAGE is subtracted from the search window SW to form the filtered grey-scale image IMAGE_FILT, as indicated at block 58.

Figure 4:
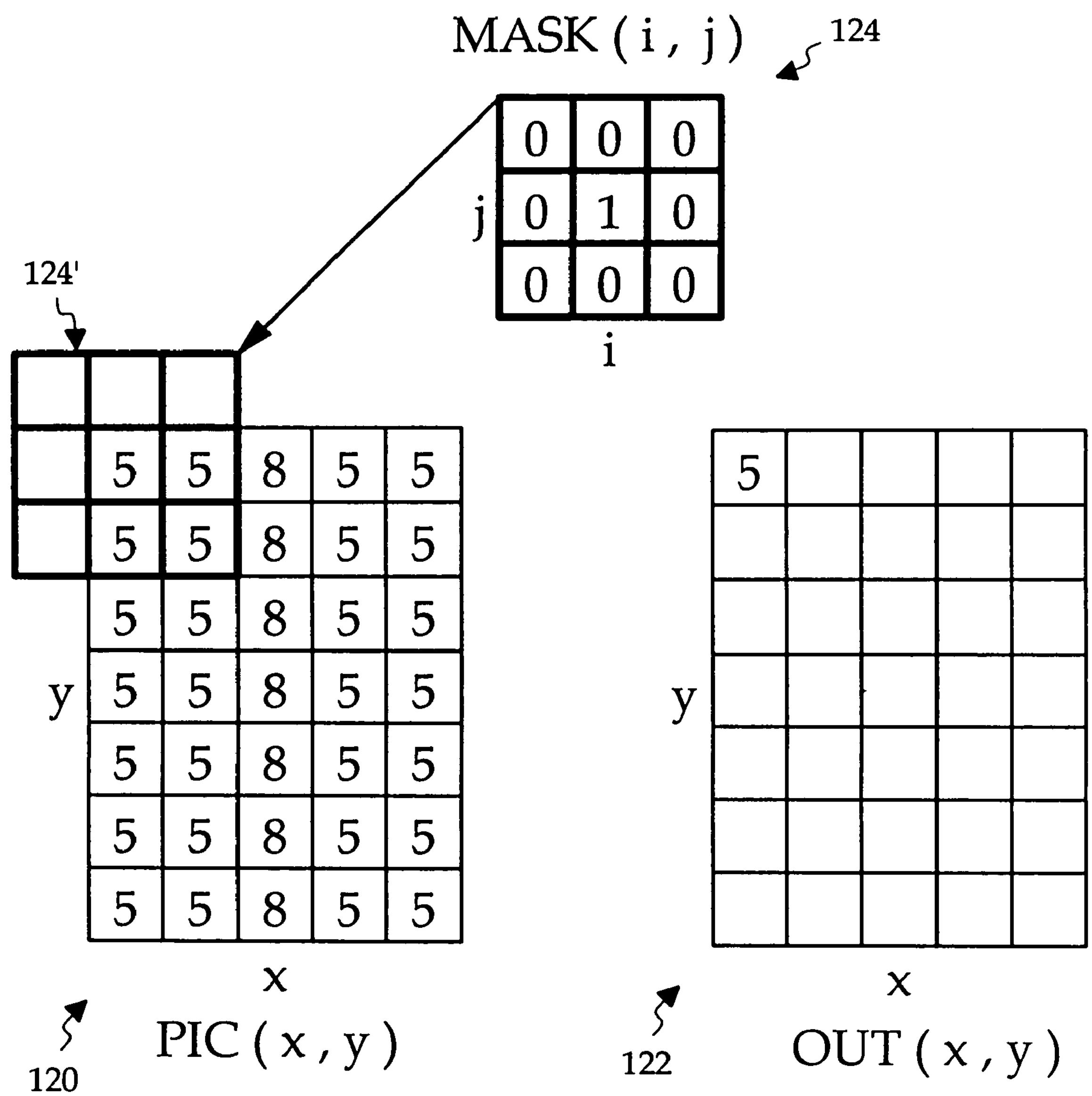
FIG. 4 is a diagram illustrating a convolution function of the type used in the hat filtering of FIG. 3.

Mathematically, the dilation and erosion convolution functions may be expressed as:

$$OUT(x, y) = \sum_{i=0}^{N-1} \sum_{j=0}^{N-1} [PIC(x - i + k, y - j + k) * MASK(i, j)]$$

where an N-by-N structuring element or mask MASK(i, j) is scanned over a larger image PIC(x,y), producing the output OUT(x,y). The process is diagrammatically depicted in FIG. 4, where the reference numerals 120, 122 and 124 respectively designate the image PIC(x,y), the output OUT(x,y) and the mask MASK(i, j). In the illustration of FIG. 4, MASK(i, j) is depicted as a non-flat 3-by-3 matrix, while PIC(x,y) and OUT(x,y) are depicted as 5-by-7 matrices. The initial scanning position of MASK(i, j) on image PIC(x,y) is designated by the reference numeral 124', producing the corresponding output value of 5. The mask is successively scanned over the image PIC(x,y) to form the output OUT (x,y). Since the mask MASK(i, j) has peripheral values of zero and a central value of one in the illustration of FIG. 4, the output OUT(x,y) will be identical to the original image PIC(x,y). In an actual implementation however, the values or gain parameters of mask MASK(i, j) vary elliptically to approximate the shape of a person's eye, so that the filtering has the effect of enhancing eye-shaped objects in the image, while attenuating background noise and clutter.

Referring again to the flow diagram of FIGS. 2A-2B, the blocks 60 and 62 are then executed to binarize the filtered grey-scale image IMAGE_FILT. The block 60 identifies the maximum intensity value (MAX_INT) of IMAGE_FILT, and sets a threshold THR equal to MAX_INT/3. The block 62 then uses the threshold THR to produce a binarized or black-and-white version of IMAGE_FILT, referred to herein as IMAGE_FILT_BW. Of course, a fixed or different binarizing threshold THR could be employed. The block 64 applies a median filter mask to IMAGE_FILT_BW to reduce noise in the image, and the block 66 processes the resulting image to fuse neighboring like-value pixels, and identify regions or pixel blobs that potentially correspond to facial features of interest. The block 68 employs window thresholding to limit the identified regions to those that are size-wise consistent with facial features, such regions being referred to herein as candidate regions. The block 70 computes a center-of-mass (COM) for each of the candidate regions, and the spatial Euclidian distance (SED) between each respective COM value and the previous state vector $S_{t-1}$. The block 72 selects the candidate region having the smallest SED value as the region most likely to correspond to the current location of the driver's eye.

Once a candidate region has been selected, the block 74 calculates two parameters pertinent to the eye state: the number of pixels NOP, and a circular shape calculation CSC. The NOP parameter is simply the number of pixels in the selected binary blob or region; in any person, this number is significantly higher when the eye is open than when the eye is closed. The CSC parameter is a difference of standard deviation (SD) calculations on the selected binary blob along orthogonal (e.g., x and y) axes—that is ($SD_x$-$SD_y$). If the binary blob is generally rounded, as would be the case with an open eye, the absolute value of CSC (that is, |CSC|) will be relatively small, say two or less. However, if the binary blob is non-rounded, as in the case of a closed eye, |CSC| will be significantly higher.

The block 76 then extracts a patch or block of pixels from the search window SW surrounding the calculated center-of-mass COM of the selected candidate region. The block 78 compares the extracted patch with a stored database or model (i.e., an eigen-space) that defines three categories of possible shapes: open-eye, closed-eye and non-eye, and uses the reconstruction error to compute an effective distance or deviation between the extracted patch and the respective eigen-space. The term DST_OPEN-EYE is the distance to the open-eye model, DST_CLOSED-EYE is the distance to the closed-eye model, and DST_NON-EYE is the distance to the non-eye model.

If DST_NON-EYE is less than both DST_OPEN-EYE and DST_CLOSED-EYE, as determined at block 80, the candidate region is considered to be a feature other than the driver's eye, and the block 82 is executed to determine if there are any more candidate regions to consider. If there are additional candidate regions, the block 84 selects the region having the next-smallest spatial Euclidian distance (SED) as the region most likely to correspond to the current location of the driver's eye, and the blocks 74-80 are re-executed as indicated by the flow diagram lines. If there are no other candidate regions to consider, the block 86 is executed to enter a recovery mode in which $IMAGE_t$ is re-analyzed to locate the driver's eye. If DST_NON-EYE is greater than either DST_OPEN-EYE or DST_CLOSED-EYE, block 80 will be answered in the negative, indicating that the candidate region is considered to be the driver's eye. In this case, the block 88 is executed to set the eye position output EYE_POS (i.e., the state vector $S_t$) equal to the center of mass COM for the selected candidate region, and the portion of the routine depicted in FIG. 2C is executed to determine the eye state output EYE_STATE.

Referring to FIG. 2C, the block 90 compares the number-of-pixels term NOP computed at block 74 with the corresponding term $NOP_{t-1}$ for the prior image $IMAGE_{t-1}$, and computes a binary size function step term BSF_STEP according to the difference ($NOP-NOP_{t-1}$). If the absolute value of BSF_STEP is less than a calibrated threshold THR, as determined at block 92, the eye state is considered to be unchanged from the prior image $IMAGE_{t-1}$, and block 94 sets the current eye state term $ES_t$ equal to the previous eye state term $ES_{t-1}$, completing the routine. If block 92 is answered in the affirmative, the blocks 96, 98 and 100 determine the value of a step sign function term BSF_SIGN. If BSF_STEP>0, BSF_SIGN is set equal to POS, indicating that the binary eye blob has significantly increased in size; otherwise, BSF_SIGN is set equal to NEG, indicating that the binary eye blob has significantly decreased in size. The blocks 102, 104 and 106 then make an appearance-based eye state decision using the distances DST_OPEN-EYE and DST_CLOSED-EYE determined at block 78. If DST_OPEN-EYE<DST_CLOSED-EYE, the appearance-based decision term ABD is set equal to OPEN; otherwise, ABD is set equal to CLOSED. The blocks 108, 110 and 112 then make an eye state decision based on the circular shape calculation CSC of block 74. If $|CSC|<2$, the CSC term is set equal to ROUND; otherwise, CSC is set equal to NON-ROUND. Finally, the determined eye state terms BSF_SIGN, CSC and ABD are applied along with the previous eye state $ES_{t-1}$ to an eye state decision matrix that may be implemented by image processor 14 with a look-up table or the like.

The charts of FIGS. 5A and 5B depict the eye state decision matrix. FIG. 5A depicts the portion of the decision matrix for BSF_SIGN=POS (i.e., for conditions where the binary eye blob has significantly increased in size), and FIG. 5B depicts the portion of the decision matrix for BSF_SIGN=NEG (i.e., for conditions where the binary eye blob has significantly decreased in size). As indicated by the right-most two columns, the decision matrix provides the outputs (eye state $ES_t$ and confidence CONF) that comprise the EYE_STATE output of image processor 14. The term $ES_t$ is either OPEN or CLOSED, and the term CONF provides an estimation of the relative reliability of the eye state assessment.

In summary, the present invention provides a robust method of tracking object movement that overcomes the deficiencies of prior methods. As applied to a driver eye, the method provides accurate and reliable tracking, as well as reliable eye state determination. While the method of the present invention has been described in reference to the illustrated embodiment, it will be recognized that various modifications in addition to those mentioned above will occur to those skilled in the art. For example, convolution calculations other than shown herein may be utilized, and so on. Accordingly, it will be understood that methods incorporating these and other modifications may fall within the scope of this invention, which is defined by the appended claims.

The invention claimed is:

1. A method of tracking movement of a human eye between first and second successively generated video images after a position of the eye in said first video image has been identified, comprising the steps of:

defining a first state vector for the first video image corresponding to the identified position of said eye;

defining a search window in said second video image based on said first state vector;

bottom hat filtering said search window with a non-flat structuring element to form a filtered image;

binarizing said filtered image and identifying candidate binary blobs that possibly correspond to said eye;

computing a spatial Euclidian distance between each candidate binary blob and said first state vector, and selecting a candidate binary blob for which the computed spatial Euclidian distance is smallest;

determining a center of mass of the selected binary blob;

defining a second state vector based on said center of mass for identifying the location of said eye in said second video image;

selecting candidate binary blobs in successively generated video images based on minimum spatial Euclidian distance;

determining a size of the selected candidate binary blobs, and computing a change in size of successively selected candidate binary blobs; and determining an eye state designating either that said eye is open or that said eye is closed and a confidence that the determined eye state is accurate by applying a sign of said change in size and a previously determined eye state to a decision matrix when said change in size has a magnitude that exceeds a threshold magnitude.

2. The method of claim 1, wherein the step of bottom hat filtering said search window includes the steps of:

scanning said non-flat structuring element over said search window using a first convolution function to form a dilation image;

rotating said structuring element;

scanning the rotated structuring element over said dilation image using a second convolution function to form an erosion image; and subtracting said erosion image from said search window to form said filtered image.

3. The method of claim 1, including the steps of:

establishing an eye model defining image characteristics of human eyes and a non-eye model defining image characteristics of facial features other than human eyes;

extracting a patch of said search window based on said center of mass;

computing deviations of said patch from said eye model and said non-eye model; and rejecting the selected candidate binary blob when the deviation of said patch from said eye model is greater than the deviation of said patch from said non-eye model.

4. The method of claim 3, wherein said eye model includes an open-eye mode defining image characteristics of open eyes and a closed-eye model defining image characteristics of closed eyes, and the method includes the steps of:

computing deviations of said patch from said open-eye model and said closed-eye model; and rejecting the selected candidate binary blob when the deviation of said patch from said non-eye model is less than both the deviation of said patch from said open-eye model and the deviation of said patch from said closed-eye model.

5. The method of claim 1, including the steps of:

establishing an open-eye model defining image characteristics of open eyes and a closed-eye model defining image characteristics of closed eyes;

computing deviations of said patch from said open-eye model and said closed-eye model;

forming a model-based determination that said eye is open when the deviation of said patch from said open-eye model is less than the deviation of said patch from said closed-eye model, and closed when the deviation of said patch from said closed-eye model is less than the deviation of said patch from said open-eye model;

determining said eye state based on said model-based determination and said sign of said change in size.

6. The method of claim 1, including the step of:

determining a shape parameter of said selected candidate binary blob according to a difference in standard deviation calculations along orthogonal axes;

forming an appearance-based determination that said eye is open if said shape parameter is less than a predefined threshold, and closed if said shape parameter is greater than said predefined threshold; and determining said eye state based on said appearance-based determination and said sign of said change in size.

* * * * *